(12) United States Patent
Bytnar

(10) Patent No.: US 7,563,386 B2
(45) Date of Patent: *Jul. 21, 2009

(54) DE-ICING COMPOSITION AND METHOD

(75) Inventor: Stephen C. Bytnar, Marshall, MN (US)

(73) Assignee: Archer-Daniels-Midland Company, Decatur, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/818,410

(22) Filed: Jun. 14, 2007

(65) Prior Publication Data

US 2007/0295932 A1    Dec. 27, 2007

Related U.S. Application Data

(63) Continuation of application No. 10/643,960, filed on Aug. 20, 2003, now abandoned, and a continuation of application No. 10/260,225, filed on Sep. 30, 2002, now abandoned, which is a continuation of application No. 10/025,210, filed on Dec. 19, 2001, now Pat. No. 6,468,442, which is a continuation of application No. PCT/US00/20218, filed on Jul. 25, 2000.

(60) Provisional application No. 60/145,576, filed on Jul. 26, 1999.

(51) Int. Cl.
    C09K 3/18    (2006.01)
(52) U.S. Cl. .......................... 252/70; 106/13
(58) Field of Classification Search ................. 252/70; 106/13
    See application file for complete search history.

(56) References Cited

U.S. PATENT DOCUMENTS

| | | | |
|---|---|---|---|
| 1,282,249 A | 10/1918 | Lewis | |
| 1,776,181 A | 9/1930 | Collins et al. | |
| 4,226,940 A * | 10/1980 | Storrs ........................ | 435/260 |
| 4,254,166 A | 3/1981 | Glanville et al. | |
| 4,358,389 A | 11/1982 | Konig-Lumer et al. | |
| 4,388,203 A | 6/1983 | Nimerick et al. | |
| 4,430,240 A | 2/1984 | Sandvig et al. | |
| 4,448,702 A | 5/1984 | Kaes | |
| 4,501,775 A | 2/1985 | Parks et al. | |
| 4,587,027 A | 5/1986 | Preusch et al. | |
| 4,613,449 A | 9/1986 | Dingess | |
| 4,664,832 A | 5/1987 | Sandvig et al. | |
| 4,676,918 A | 6/1987 | Toth et al. | |
| 4,728,393 A | 3/1988 | Peel | |
| 4,746,449 A | 5/1988 | Peel | |
| 4,778,615 A | 10/1988 | Jeglic | |
| 4,824,588 A | 4/1989 | Lin | |
| 4,869,841 A | 9/1989 | Matteodo et al. | |
| 4,960,531 A | 10/1990 | Connor et al. | |
| 5,135,674 A | 8/1992 | Kuhajek et al. | |
| 5,324,442 A | 6/1994 | Matthews | |
| 5,395,658 A | 3/1995 | Jaklin | |
| 5,635,101 A | 6/1997 | Janke et al. | |
| 5,639,319 A | 6/1997 | Daly | |
| 5,709,812 A | 1/1998 | Janke et al. | |
| 5,709,813 A | 1/1998 | Janke et al. | |
| 5,817,252 A | 10/1998 | Hu et al. | |
| 5,849,356 A | 12/1998 | Gambino et al. | |
| 5,853,610 A | 12/1998 | Kaes | |
| 5,876,621 A | 3/1999 | Sapienza | |
| 5,919,394 A | 7/1999 | Janke et al. | |
| 5,922,240 A | 7/1999 | Johnson et al. | |
| 5,932,135 A | 8/1999 | Janke et al. | |
| 5,965,058 A | 10/1999 | Janke et al. | |
| 5,980,774 A | 11/1999 | Sapienza | |
| 5,993,684 A | 11/1999 | Back et al. | |
| 6,080,330 A | 6/2000 | Bloomer | |
| 6,129,857 A | 10/2000 | Sapienza | |
| 6,149,834 A | 11/2000 | Gall et al. | |
| 6,299,793 B1 * | 10/2001 | Hartley et al. ................. | 252/70 |
| 6,315,919 B1 | 11/2001 | Sapienza | |
| 6,398,979 B2 | 6/2002 | Koefod et al. | |
| 6,416,684 B1 | 7/2002 | Bloomer | |
| 6,436,310 B1 * | 8/2002 | Hartley et al. ................. | 252/70 |
| 6,440,325 B1 | 8/2002 | Hartley et al. | |
| 6,468,442 B2 * | 10/2002 | Bytnar ........................ | 252/70 |
| 6,506,318 B1 | 1/2003 | Sapienza et al. | |
| 6,540,934 B2 | 4/2003 | Sapienza | |

(Continued)

FOREIGN PATENT DOCUMENTS

CA    2 256 103 A1    7/1999

(Continued)

OTHER PUBLICATIONS

Decision and Order, *Cargill, Incorporated v. Sears Petroleum & Transport Corp. and Sears Ecological Applications Co., LLC*, Civil Action No. 5:03-CV-0530 (DEP), (NDNY, Aug. 27, 2004), pp. 197-251.

(Continued)

*Primary Examiner*—Anthony J Green
(74) *Attorney, Agent, or Firm*—K&L Gates LLP

(57) ABSTRACT

A composition for reducing the buildup of snow and ice on a surface. The composition includes a sugar-water mixture having approximately 15 to 80 percent by weight of a sugar solid, wherein the sugar solid contains approximately 2-60 percent by weight of a monosaccharide.

15 Claims, 9 Drawing Sheets

U.S. PATENT DOCUMENTS

| | | | |
|---|---|---|---|
| 6,544,434 | B2 | 4/2003 | Sapienza |
| 6,582,622 | B1 * | 6/2003 | Hartley et al. ............. 252/70 |
| 6,599,440 | B2 * | 7/2003 | Hartley et al. ............. 252/70 |
| 6,770,217 | B2 | 8/2004 | Hartley et al. |
| 6,805,811 | B2 | 10/2004 | Hartley et al. |
| 6,827,873 | B2 * | 12/2004 | Hartley et al. ............. 252/70 |
| 6,843,931 | B2 | 1/2005 | Sapienza |
| 6,852,247 | B2 * | 2/2005 | Bytnar ....................... 252/70 |
| 2003/0107022 | A1 | 6/2003 | Bytnar |
| 2003/0136940 | A1 | 7/2003 | Sapienza et al. |
| 2003/0168625 | A1 | 9/2003 | Sapienza |
| 2003/0205694 | A1 | 11/2003 | Sapienza et al. |
| 2005/0001198 | A1 | 1/2005 | Bytnar |

FOREIGN PATENT DOCUMENTS

| | | |
|---|---|---|
| GB | 166609 | 7/1921 |
| GB | 796633 | 6/1958 |
| GB | 2 308 810 A | 7/1997 |
| JP | 62201566 | 9/1987 |
| JP | 2-202574 | 8/1990 |
| RU | 2086237 C1 | 8/1997 |
| WO | WO 99/16846 A | 4/1999 |
| WO | WO 01/07532 A1 | 2/2001 |

OTHER PUBLICATIONS

International Search Report (PCT/US00/20218) dated Nov. 14, 2000.

International Preliminary Examination Report (PCT/US00/20218) dated Aug. 16, 2001.

ASTM D 1177-94 *Standard Test Method for Freezing Point of Aqueous Engine Coolants* (Re-approved 1998). [no month].

Alexander, R. J., *Sweeteners: Nutritive*, Eagan Press, Str. Paul, p. 17 (1997). [no month].

Excerpts from the *Critical Data Tables* of the Corn Refiners Association (BeMiller Report). [no date].

Hackh, Ingo W.D., *A Chemical Dictionary*, The Maple Press Co., York, PA, pp. 332-334 (1929). [no month].

Rendleman, J.A., Complexes of alkali metals and alkaline-earth metals with carbohydrates, *Advances in Carbohydrate Chemistry*, vol. 21, 1966, pp. 211-212. [no month].

Sebree, B.R. et al., *Brewers Condensed Solubles. I. Compositions and Physical Properties*, Cereal Chem. 60(2):147-151 (1983). [no month].

Vigoro, *Common Ice Melter Ingredients*, www.vigoro.on.ca/ice/ingred.html., (Aug. 30, 1998).

Vollhardt, K.P.C., *Organic Chemistry*, W. H. Freeman, p. 1066, (1987). [no month].

* cited by examiner

Phase Data

*Fig. 3*

| % DS | MgCl2 | CaCl2 | NaCl | Ice Ban M50 | Ice Ban M80 | Caliber M1000 | Caliber C1500 | Caliber S1000 |
|---|---|---|---|---|---|---|---|---|
| 4 | 29 | 30 | 28 | 30 | 29 | 29 | 29 | 30 |
| 5 | 26 | 29 | 27 | 30 | 28 | 27 | 29 | 28 |
| 6 | 25 | 28 | 26 | 29 | 27 | 26 | 28 | 27 |
| 7 | 24 | 26 | 24 | 29 | 25 | 25 | 26 | 26 |
| 8 | 22 | 24 | 23 | 28 | 23 | 23 | 24 | 24 |
| 9 | 20 | 22 | 22 | 27 | 21 | 22 | 22 | 22 |
| 10 | 18 | 20 | 20 | 26 | 19 | 20 | 20 | 20 |
| 11 | 16 | 18 | 19 | 25 | 17 | 18 | 18 | 19 |
| 12 | 13 | 16 | 17 | 24 | 15 | 16 | 15 | 18 |
| 13 | 10 | 14 | 16 | 23 | 13 | 14 | 13 | 16 |
| 14 | 7 | 12 | 14 | 22 | 11 | 11 | 10 | 14 |
| 15 | 4 | 10 | 12 | 21 | 9 | 8 | 7 | 12 |
| 16 | 0 | 8 | 11 | 20 | 7 | 5 | 4 | 9 |
| 17 | -3 | 5 | 9 | 19 | 4 | 2 | 1 | 6 |
| 18 | -8 | 2 | 7 | 17 | 1 | -2 | -2 | 4 |
| 19 | -13 | -1 | 5 | 15 | -2 | -6 | -5 | 2 |
| 20 | -17 | -4 | 2 | 13 | -5 | -11 | -8 | 0 |
| 21 | -23 | -8 | 0 | 12 | -8 | -17 | -11 | -2 |
| 22 | -27 | -12 | -3 | 10 | -11 | -23 | -14 | -4 |
| 23 | -20 | -16 | -5 | 9 | -15 | -29 | -21 | -6 |
| 24 | -14 | -20 | 1 | 7 | -19 | -35 | -25 | -8 |
| 25 | -10 | -25 | 13 | 6 | -23 | -42 | -29 | -10 |
| 26 | -6 | -31 | 28 | 5 | -27 | -49 | -33 | -12 |
| 27 | -3 | -38 |  | 4 | -31 | -56 | -37 |  |
| 28 | -1 | -46 |  | 2 | -34 | -63 | -43 |  |
| 29 | 1 | -53 |  | 1 | -37 | -71 | -49 |  |
| 30 | 2 | -52 |  | 0 | -40 | -79 | -56 |  |
| 31 |  | -34 |  | -3 | -41 | -82 | -63 |  |
| 32 |  | -17 |  | -6 | -42 | -85 | -70 |  |
| 33 |  |  |  | -9 | -43 |  | -63 |  |
| 34 |  |  |  | -12 | -44 |  | -55 |  |
| 35 |  |  |  | -15 | -45 |  | -47 |  |
| 36 |  |  |  | -17 |  |  | -40 |  |
| 37 |  |  |  | -21 |  |  |  |  |
| 38 |  |  |  | -28 |  |  |  |  |
| 39 |  |  |  | -35 |  |  |  |  |
| 40 |  |  |  | -40 |  |  |  |  |

DE-ICING COMPOSITION AND METHOD

CROSS REFERENCE TO RELATED APPLICATIONS

This application is a continuation of, and hereby incorporates by reference, U.S. patent application Ser. No. 10/643,960, filed Aug. 20, 2003, now abandoned; and Ser. No. 10/260,255, filed Sep. 30, 2002, now abandoned, which is a continuation of and hereby incorporates by reference, U.S. patent application Ser. No. 10/025,210, filed Dec. 19, 2001 and issued as U.S. Pat. No. 6,468,442 on Oct. 22, 2002, which is a continuation of, and hereby incorporated by reference, Application No. PCT/US00/20218 filed Jul. 25, 2000 and published Feb. 1, 2001 as International Publication No. WO/01/07532, which, in turn, claims priority to, and hereby incorporates by reference, U.S. Provisional Application No. 60/145,576, filed Jul. 26, 1999.

FIELD

This invention relates to a de-icing composition and method for reducing the buildup of snow and ice on roads and other outdoor surfaces. More particularly, this invention relates to a de-icing composition and method that exhibits low corrosive effects, has a low eutectic point, and is environmentally safe.

BACKGROUND

Chloride salts have been applied on roads to inhibit the accumulation of snow and ice for many years. Such chloride salts may be applied to the surface of the road directly in solid form or in admixture with water or some other liquid. Spreaders, for instance, may apply solid or liquid de-icing compositions somewhat evenly over the surface of roads. Other substances, such as sand, may also be applied to the road with the solid or liquid composition having chloride salts to treat the roads and help reduce slipping on the road.

Brine solutions that contain high concentrations of earth metal and chloride ions are commonly used for application to roads. As long as the concentration of ions in the brine solution remains high enough, the solution remains in a liquid form and is useful as a de-icer. Once the solution is diluted below a critical ion concentration for a specific temperature, ice crystals begin to form in the solution and it is no longer useful as a de-icer.

Chloride salts and brine solutions have numerous problems as road de-icers. A first problem is that typical brine solutions containing chloride salts do not exhibit useful melting properties below, at the lowest, about −5 deg. F. A second problem is that such brine solutions impact the environment in negative ways. They may damage the soil and vegetation surrounding the road, in large part because of the salts, they may adversely impact surrounding lakes, rivers, or streams, and the compounds may be absorbed into water supplies. A final problem is that such brine solutions may exhibit corrosive effects, damaging vehicles on roads as well as the structure of the roads themselves. Many states have therefore limited the use of salt on roads.

De-icing compositions and methods have been developed that particularly solve some of the above problems of prior de-icing compositions and methods. U.S. Pat. No. 4,676,918 to Toth et al., for instance, discloses an anti-freeze composition for prohibiting the buildup of snow and ice that contains, as a primary component, a waste concentrate of the alcohol distilling industry. U.S. Pat. Nos. 5,635,101; 5,709,812; and 5,709,813, all of which name Janke et al. as inventors, disclose the use of steepwater solubles from the wet milling process for corn, whey, and winemaking residue, respectively, as the primary ingredients in de-icing compositions. According to these patents, the compositions disclosed therein provide environmental and corrosive-inhibiting benefits over salt de-icers.

These prior art de-icing compositions also have numerous disadvantages and problems. The freezing point of such de-icing compositions are typically not as low as may be desirable. Such compositions may contain a higher level of insoluble material than is desirable, which makes it more difficult to mix into liquid de-icers which may be easily spread onto roads. These de-icing compositions may also contain materials that may be harmful to the environment. For instance, some steepwater solubles compositions contain a large amount of phosphorus, which may be harmful to the environment. Typical steepwater solubles de-icing compositions have a pH around 3.0. Because a neutral pH (7.0) or a pH as close to neutral as possible is desirable for the environment, such steepwater solubles de-icing compositions may harm the environment.

An improved de-icing composition and method is needed that is environmentally safe, has a low freezing point and thus melts a large amount of snow and ice by suppressing ice crystal formation, exhibits low corrosive effects, and that maintains a high viscosity at low temperatures. Such a de-icing composition and method preferably solves the above problems of prior art de-icing compositions and is inexpensive to produce in large quantities.

SUMMARY

One embodiment of the invention is a composition for reducing the buildup of snow and ice on outdoor surfaces comprising a sugar-water mixture. A variety of sugars may be used within the scope of the invention, and the sugars may also be used in a variety of concentrations. For example, sugar concentrations as low as 5% may be useful as de-icing agents without other additives to the de-icing agent. Sugar concentrations as low as 1% may be useful as de-icing agents when mixed with a brine solution. Another embodiment of the composition of the invention comprises adding a brine solution to the sugar-water mixture. A variety of salts, including magnesium chloride, may be used within the scope of the invention. The brine mixture and the sugar-water mixture may be combined in varying amounts to form the composition of the invention.

Another embodiment of the invention is a method for reducing the buildup of snow and ice on outdoor surfaces comprising applying a sugar-water mixture to the surface of the outdoor surface.

BRIEF DESCRIPTION OF THE DRAWINGS

FIG. 3 is a chart that shows phase data for various embodiments of the invention, as well as for various prior art blends.

DETAILED DESCRIPTION

A. General Overview

Figure 1:
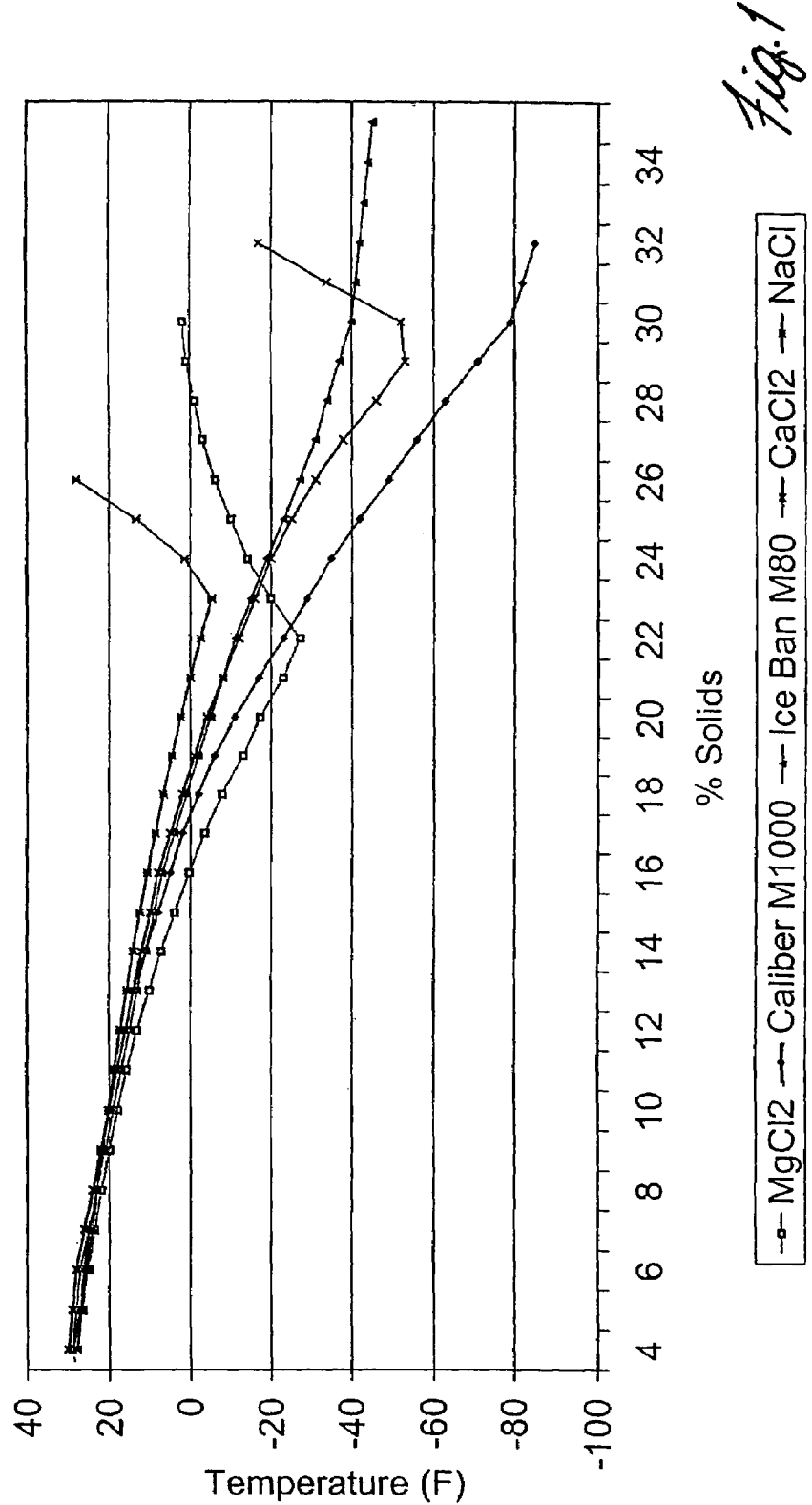
FIG. 1 is a graph showing phase data for embodiments of the invention compared to prior art de-icers.

The de-icing embodiments of the invention discussed below may be used as an anti-icing or de-icing agent on surfaces, such as outdoor surfaces, or for pre-wetting of solids or pre-treating of stockpiles of solids to be used as anti-icing or de-icing agents. Any of the compositions described below may be applied to surfaces at varying rates as de-icing compositions.

One embodiment of the invention is a composition for reducing the buildup of snow and ice on outdoor surfaces. In this embodiment, the composition contains a sweetwater (sugar-water) mixture. Another embodiment of the composition of the invention comprises adding a brine solution to the sweetwater mixture. The brine mixture and the sweetwater mixture may be combined in varying amounts to form the composition of the invention. A corrosion inhibitor may also be added to the composition. In addition, a steepwater solubles mixture, which may function partially as a corrosion inhibitor, may be added to the composition. The composition of the invention may contain sweetwater and, optionally, any combination of brine, steepwater solubles, and a corrosion inhibitor. Further, the composition of the invention may, in one embodiment, contain any combination of the ingredients listed above in a dry matter form.

A variety of sugars may be used within the scope of the invention. In one embodiment, the invention may contain a sugar solution (sweetwater) with as little as 5% sugar solids. Such a mixture may exhibit desirable corrosion characteristics and a sufficiently low eutectic point to suffice as a de-icing agent. In another embodiment, sweetwater may be mixed with a brine solution such that the mixture of sweetwater and brine contains as little as 1% sugar solids, and the mixture may suffice as a de-icing agent with beneficial characteristics over a pure brine solution.

B. The Sugar of the Invention

Within the scope of the invention, a variety of sugars may be used, including but not limited to corn sugar, cane sugar, beet sugar, sorghum sugar, maple sugar, wheat sugar, tapioca sugar, potato sugar, cassava sugar, and manioca sugar. The composition of the invention may contain a sugar-water mixture or, in another embodiment, the composition may contain a de-icing agent that is a sugar solid. In one embodiment of the invention, the sugar solid may contain approximately 2-60 percent by weight of a monosaccharide. In other embodiments, the sugar solid may contain about 6-39 percent by weight of the monosaccharide, or 12-18 percent by weight of the monosaccharide solid. In yet other embodiments, the sugar solid may contain about 14 percent by weight of the monosaccharide. The term "monosaccharide" will be used throughout this specification to refer to a single molecule sugar unit, such as, but not limited to, dextrose. The balance of the sugar solid may be polymers of dextrose.

One embodiment of the invention uses 25 Dextrose Equivalent (D.E.) corn syrup (CSU) in the sweetwater, although other varieties of corn syrups may also be used. One suitable 25 D.E. corn syrup has the following profile:
77.5% solids
5.0 pH
0.3% ash Carbohydrate profile on a dry solid basis (D.S.B.)
dextrose: 8%
maltose: 8%
malt-triose: 8%
higher saccharides: 76%

The 25 D.E. corn syrup may be diluted with water to about 40 percent solids, although any concentration of 25 D.E. corn syrup could be used, such as 30-70 percent solids. This 25 D.E. corn syrup diluted to 40 percent solids may then be mixed with other substances, in particular chloride salts, in varying ratios to produce a mixture with desired melting capacities and corrosion characteristics. It should be noted that the final percent solids in the mixture may be a significant number for performance of the mixtures of the invention.

Another embodiment of the invention uses 36 D.E. corn syrup (CSU) in the sweetwater. One suitable 36 D.E. corn syrup has the following carbohydrate profile on a dry solid basis:
dextrose: 14%
maltose: 11.5%
malt-triose: 10.5%
higher saccharides: 64%

In addition, 43 D.E. corn syrup, 63 D.E. corn syrup, and other corn syrups could also be used in the sweetwater. The corn syrup or other sweetwater of the invention may be used in varying percent sugar solids. For example, in one embodiment, the corn syrup or sweetwater may have a sugar solids percent of about 15-90 percent. In other embodiments, the corn syrup or sweetwater may have 15-80 percent sugar solids, 30-75 percent sugar solids, 40-70 percent sugar solids, 50-70 percent sugar solids, or 60 percent sugar solids. The corn syrup used within the scope of the invention may be made by any process known to those skilled in the art, including a wet corn milling process.

In one embodiment, a sugar profile of the corn syrup may be about 2-60 percent dextrose, 2-60 percent maltose, 2-60 percent maltotriose, and 15-80 percent polymers of dextrose. In another embodiment, the sugar profile of the corn syrup may be about 14 percent dextrose, 11-12 percent maltose, 10-11 percent maltotriose, and 64 percent polymers of dextrose. In still other embodiments, the sugar solid contains approximately 6-40 percent by weight of the monosaccharide, approximately 12-18 percent by weight of the monosaccharide, or approximately 14 percent by weight of the monosaccharide.

C. Salt and Additives

As noted above, a variety of additives may be mixed to the sweetwater solution within the scope of the invention to enhance the performance characteristics of the sweetwater as a de-icing composition. A variety of chloride salts, including magnesium chloride, calcium chloride, sodium chloride, or potassium chloride may be added to the sweetwater. Such salts may be added in widely varying quantities. In one embodiment, a brine solution may be added to the sweetwater of the composition. In different embodiments, the brine mixture may contain approximately 15-70 percent salt, 15-60 percent salt, or 30-70 percent salt.

Other additives that may enhance the performance of the sweetwater as a de-icing agent include rock salt, sand, cinders, abrasives, gravel, urea, calcium magnesium acetate (CMA), potassium acetate (KAC), and any other additives known to those skilled in the art. Other additives, such as lactic acid, glycerol, citric acid, or acetic acid may also be added to the sweetwater within the scope of the invention. In addition, thickeners known to those skilled in the art, such as xanthum gum, may be used to enhance the viscosity profile of the embodiments of the invention. It should be noted that a mixture of the invention containing CMA may form a product that is more environmentally friendly and offers improved corrosion characteristics over a product containing a salt solution, as chlorine salts can cause numerous environmental problems on both land and in water.

In one embodiment, a sweetwater composition may be mixed with a 30% magnesium chloride brine, which is commonly available and used commercially as a road de-icer. Other concentrations of magnesium chloride brine or other brine solutions may also be used. The magnesium chloride brine and sweetwater may be mixed in a number of different ratios, each of which produces different performance characteristics.

D. The Corrosion Inhibitor

One embodiment of the composition of the invention contains a corrosion inhibitor. Any commercially available corrosion inhibitor may be used within the scope of the invention. One such corrosion inhibitor is sodium citrate, which may have a 7.0 pH. The sodium citrate (7.0 pH) solution may be added to the mixture to enhance the corrosion characteristics of the product.

The composition of the invention may also contain additional additives to enhance the properties of the mixtures. For example, steepwater (sometimes referred to as s.w., condensed fermented corn extractives, or steepwater solubles) may be used as an additive in varying amounts to enhance corrosion characteristics and/or other characteristics of the invention. The term "corrosion inhibitor," therefore, may refer to any commercially available product to inhibit corrosion, or to any blend of corrosion inhibiting products, including a blend of steepwater and sodium citrate. In one embodiment, the steepwater may be about 20 to 80 percent by weight solids with the balance being water. In other embodiments, the steepwater may be about 30-70 percent solids, 40-60 percent solids, or 50 percent solids.

The steepwater used within the scope of the invention may be made by any type of process known to those skilled in the art. In one typical steeping process, corn is soaked in water for about 20 to 40 hours. Approximately 0.1 percent sulfur dioxide is added to the water to facilitate the steeping process. The corn then begins to soften and swell. The mild acidity of the water loosens the gluten bonds within the corn and releases the starch. The corn is then removed and goes on to further processing. The resulting water in the tank is called light corn steep liquor, which may be condensed into steepwater (condensed corn steep liquor). Different processing plants may have variations in the analysis of the steepwater produced depending on the process and the composition of the corn. Some wet corn milling plants also produce ethanol, with the resulting wet distillers solubles co-product being frequently added to the steepwater with the resulting mixture still being referred to as steepwater. As used in this specification, therefore, "steepwater" refers to a blend of the steepwater produced from wet corn milling or to the steepwater produced from wet corn milling with distillers solubles or corn syrup refinery insolubles. Any liquid byproduct from agricultural processing that is used in an animal feed of the invention may be produced in any manner known to those skilled in the art.

E. Examples

In one embodiment, the sweetwater composition may be combined with a steepwater solubles-water admixture containing approximately 20 to 80 percent by weight of steepwater solubles. This embodiment may also contain a brine mixture containing approximately 15 to 60 percent salt. In one embodiment, this composition may contain about 50-95 percent by volume of the brine mixture, 5-50 percent by volume of the sugar-water mixture, and 0.5-5 percent by volume of the corrosion inhibitor.

In another embodiment, about 1-10 percent by volume of a corrosion inhibitor may be mixed with about 90-99 percent of a sugar-water mixture to form the composition of the invention. Typically, however, a corrosion inhibitor may only be needed in embodiments of the composition that contain a chloride brine. In addition, steepwater, which may serve as a corrosion inhibitor, may, in some embodiments, only be used in embodiments of the invention that contain chloride brines.

In another embodiment, the composition may have approximately 15-50 percent by weight on a dry basis of a sugar solid, approximately 60-90 percent by weight on a dry basis of a salt, and approximately 0.05-2 percent by weight on a dry basis of a corrosion inhibitor.

In still other embodiments, a sugar-water mixture having approximately 15 to 80 percent by weight of a sugar solid may be added with a brine containing 15-40% salt by weight to form the composition of the invention. A corrosion inhibitor may also be added to this composition to form a composition having approximately 50-95 percent by volume of the brine, 5-50 percent by volume of the sugar-water mixture, and 0.5-5 percent by volume of the corrosion inhibitor.

In another embodiment, a steepwater solubles-water admixture may be combined with a sugar-water mixture and a brine mixture to form the composition of the invention. In such an embodiment, the composition may contain about 80 percent by weight of the brine mixture, 6 to 7 percent by weight of the steepwater solubles-water admixture, and 13 to 14 percent by weight of the sugar-water mixture. In another variation, such a composition may contain about 50-95 percent by volume of the brine mixture, 0.5-20 percent by volume of the steepwater solubles-water admixture, and 5-50 percent by volume of the sugar-water mixture.

In one embodiment, the composition may have about 90-95 percent by volume of the sugar-water mixture, 4-9 percent by volume of the steepwater solubles-water admixture, and 0.5-2 percent by volume of a corrosion inhibitor of sodium citrate.

One specific embodiment of the composition contains 92.5% by volume of a 36 D.E. corn syrup at about 60 percent solids, 6.4 percent by volume of steepwater at about 50 percent solids, and 1.1 percent sodium citrate at about 32 percent solids. Such a material, which will be referred to as Blend No. 1, could be mixed with varying amounts of steepwater, although in some embodiments, steepwater may only be used in embodiments of the blend containing chloride brines in which a corrosion inhibitor may be desired. If brine is added to Blend No. 1, therefore, it may also be desirable to add steepwater to the blend, which may function as a corrosion inhibitor. In addition, magnesium chloride brine, calcium chloride brine, or sodium chloride brine could be mixed with Blend No. 1 to produce de-icing compositions.

Another embodiment of the invention is a blend of 25 D.E. corn syrup at about 40 percent solids. Such a blend may be mixed with magnesium chloride to form a blend of about 10 percent by volume of the 25 D.E. corn syrup and 90 percent by volume of the magnesium chloride brine. In other embodiments, the 25 D.E. corn syrup may be mixed with magnesium chloride brine to form a product with a ratio of brine to corn syrup of 80:20 or 60:40.

Blend No. 1 may also be mixed with brines to form blends of varying composition. One blend, referred to throughout the attached FIGS. 1-9 as "Caliber M1000," may contain about 90 percent magnesium chloride brine by volume and 10 percent of Blend No. 1 by volume. Another blend, referred to as "Caliber M2000," may contain about 80 percent magnesium chloride brine by volume and 20 percent of Blend No. 1 by volume. Still other blends may have about 15 percent of Blend No. 1 and 85 percent by volume of a calcium chloride brine. Such a blend is referred to in FIGS. 1-9 as "Caliber C1500." Another blend, referred to in FIGS. 1-9 as "Caliber C1000-LS," may contain about 10 percent calcium chloride brine by volume and about 90 percent Blend No. 1 by volume. Another embodiment, referred to as "Caliber S1000," may contain about 90 percent sodium chloride brine by volume and 10 percent of Blend No. 1 by volume.

FIGS. 1-9 depict various properties and characteristics of embodiments of the invention. In general, a number of characteristics may be desirable for a de-icing composition of the invention, such as a low eutectic point, a pH near 7.0, and a low corrosion percentage. FIG. 1 illustrates a phase data chart and diagram for one embodiment of the invention, Caliber M1000, compared to a magnesium chloride brine, a calcium chloride brine, a sodium chloride brine, and a commercial product known as Ice Ban M80. The products referred to as "M50" and "M80" throughout this specification are commercially available products known as Ice Ban M50 and Ice Ban M80, and are manufactured and sold by Natural Solutions, Inc. of Chesapeake, Va. In FIG. 1, the percent solids refers to the overall percentage of solids in the solution tested, and different percentages indicate that various amounts of water were added to the solution tested. As FIG. 1 illustrates, the embodiment of the invention referred to as Caliber M1000 has a lower eutectic point at a percent solid of about 30-34 percent and also at any point above about 22 percent solids. FIG. 1 also shows that certain of the tested blends, such as magnesium chloride, calcium chloride, and sodium chloride, drop crystals at certain percent solids, and hence the right end of the graph for these blends veers upward. Such an effect does not take place with the embodiment of the invention referred to as Caliber M1000. FIG. 3 is a chart that shows phase data (eutectic point at different percent solids, which is referred to as "% DS" in FIG. 3) for various embodiments of the invention, as well as for various prior art blends.

Figure 2:
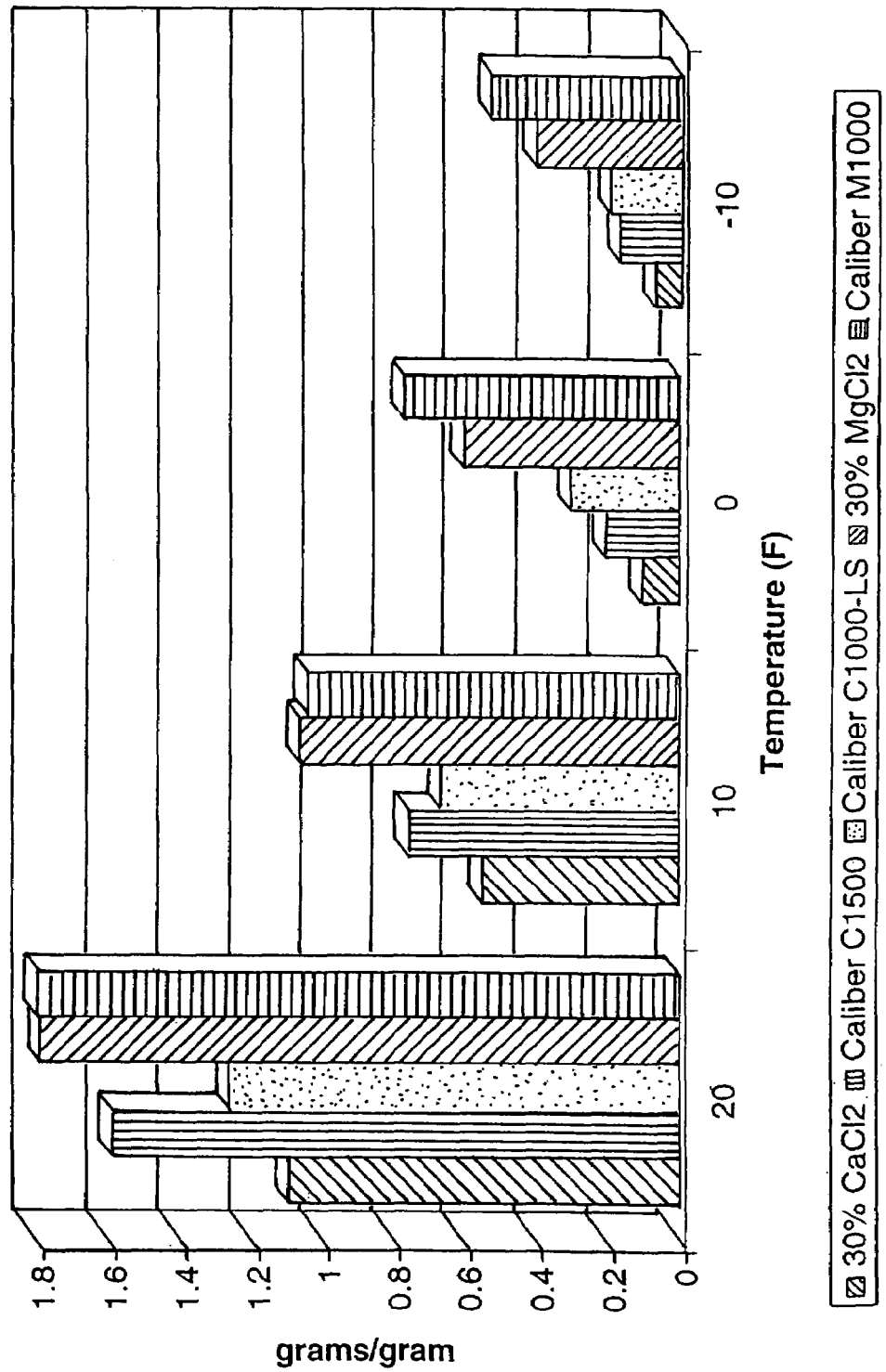
FIG. 2 is a chart depicting the melting capacity for various embodiments of the composition of the invention compared to prior art blends.

FIG. 2 is a chart depicting the melting capacity for various embodiments of the composition of the invention compared to prior art blends. The reference to a melting capacity refers to the grams of ice melted per gram of product at varying temperatures (as shown on the horizontal axis) in 20 minutes. FIG. 2 shows that the embodiment of the invention referred to as Caliber M1000 has a melting capacity that comes close to meeting or exceeding the melting capacity of other common blends, and in particular a 30 percent magnesium chloride blend. At low temperatures, such as 0 deg. F. or −10 deg. F., FIG. 2 shows that the Caliber M1000 blend has a greater melting capacity than any of the other listed blends.

Figure 4:
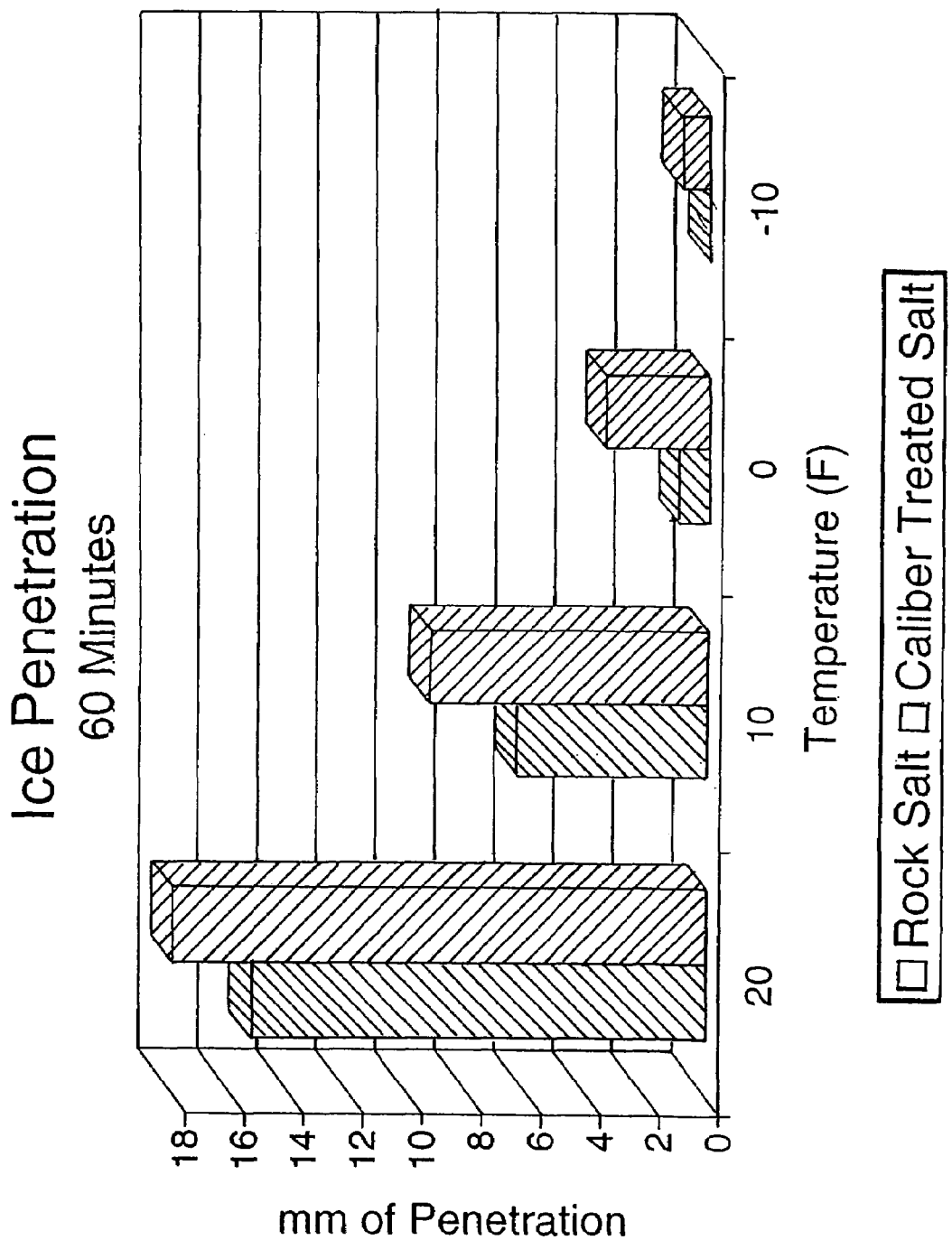
FIG. 4 is a chart showing the ice penetration for rock salt compared to rock salt treated with a composition of the invention.
Figure 5:
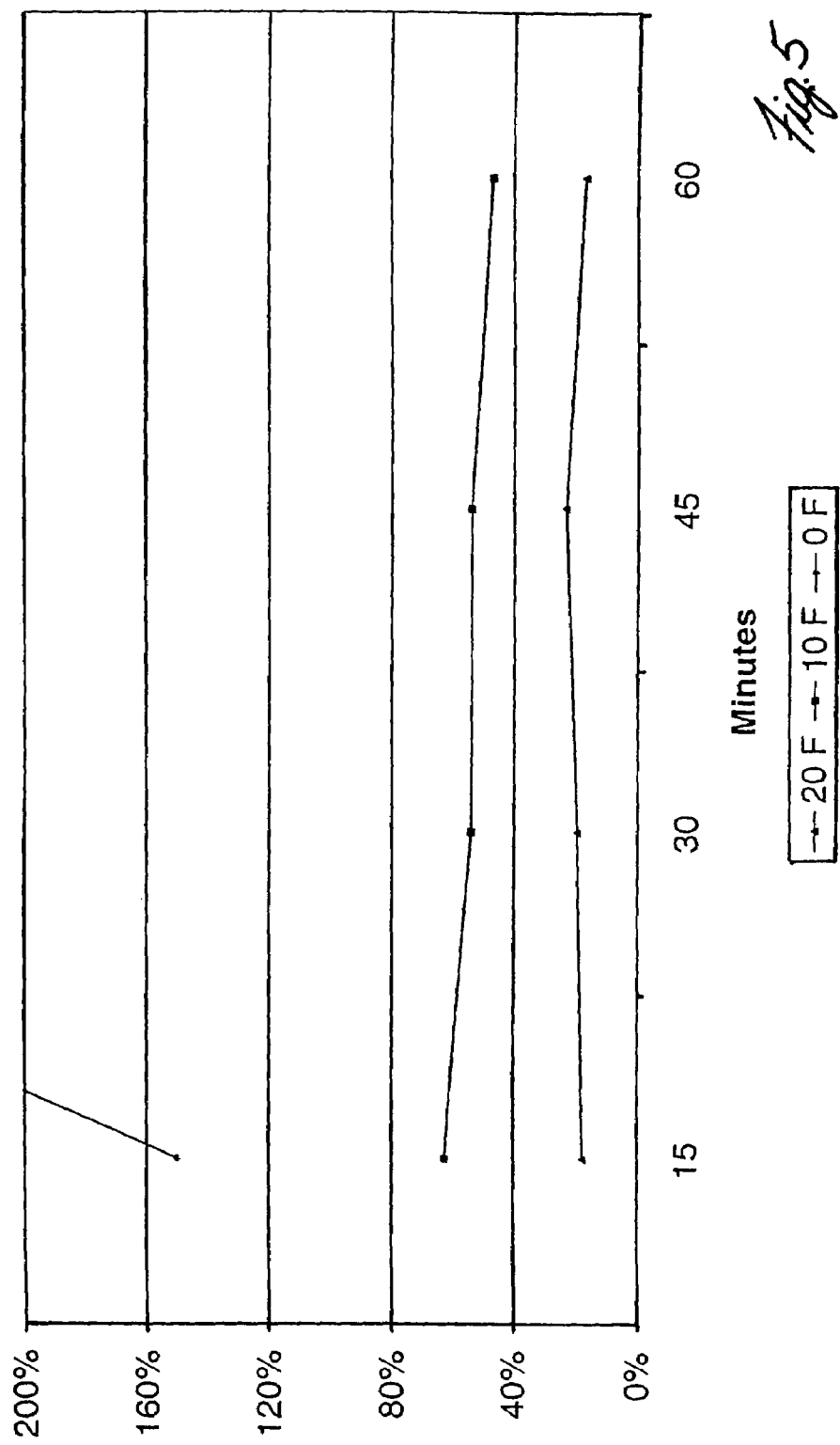
FIG. 5 is a graph showing the percent increase in ice penetration of rock salt treated with a composition of the invention compared to untreated rock salt.

FIG. 4 is a chart showing the ice penetration for rock salt compared to rock salt treated with Caliber M2000. To treat the rock salt, 8 gallons of Caliber M2000 was added to each ton of rock salt. The reference to ice penetration refers to the amount of penetration of the product in millimeters at 5 deg. F. in 20 minutes. As FIG. 4 indicates, the treated rock salt has a greater penetration than the untreated rock salt. FIG. 5 shows the percent increase in ice penetration of rock salt treated with Caliber M2000 as described above over untreated rock salt. FIG. 5 shows a significant increase in percent ice penetration for salt treated with compositions of the invention, particularly at low temperatures.

Figure 6:
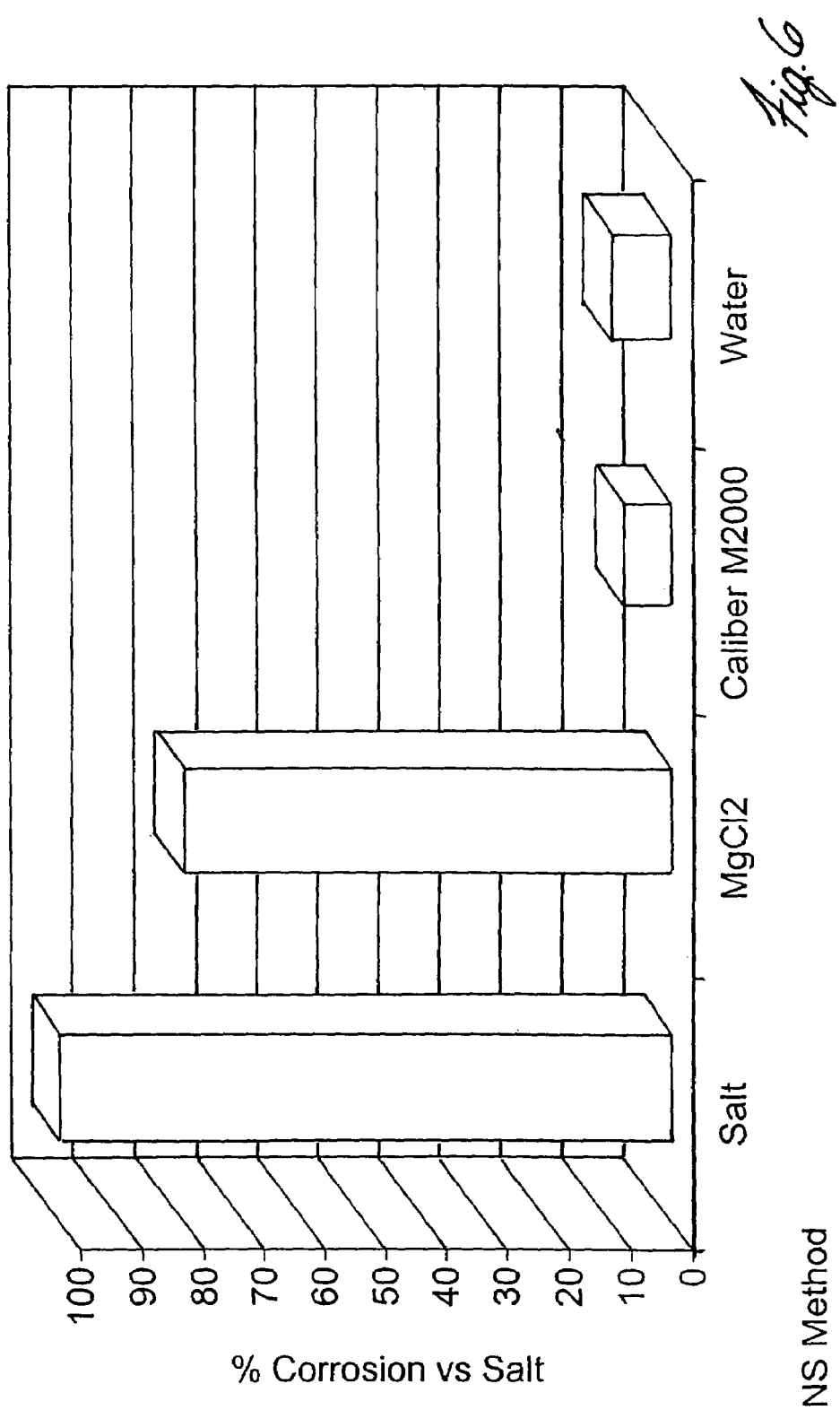
FIG. 6 is a chart showing the reduced corrosion caused by one composition of the invention over prior art blends.
Figure 7:
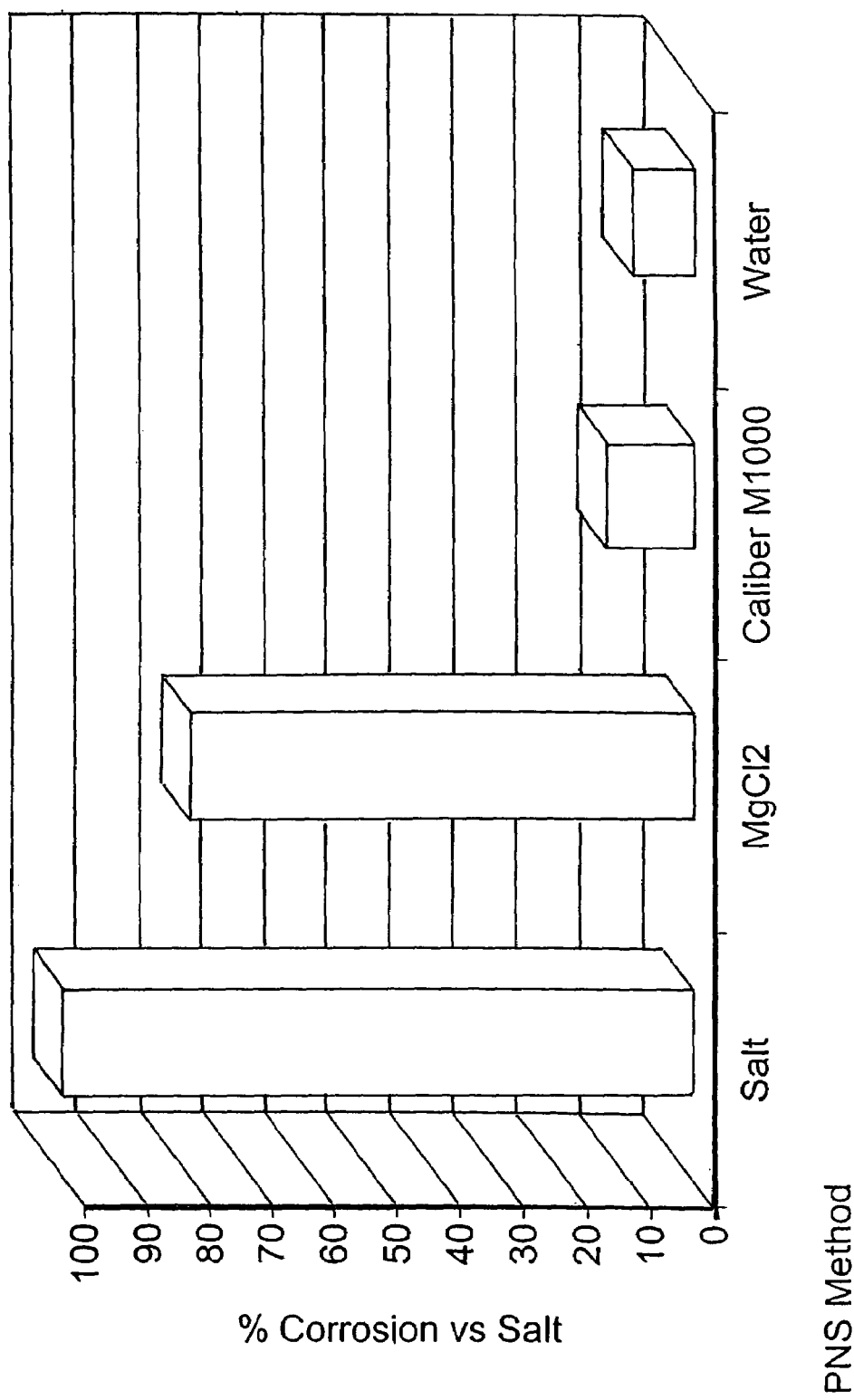
FIG. 7 is a second chart showing the reduced corrosion caused by one composition of the invention over prior art blends.

Reduced corrosion is one benefit of the compositions of the invention, and FIGS. 6 and 7 illustrate such benefits. In FIGS. 6 and 7, salt is the standard by which corrosiveness is measured, and salt therefore has a corrosion percent of 100 percent. Magnesium chloride brine, as FIGS. 6 and 7 illustrate, is slightly less corrosive than salt (sodium chloride). The embodiments of the invention described above as Caliber M2000 and Caliber M1000 have a significantly lower corrosive effect than salt—around 10 percent or less of the corrosiveness of salt.

Figure 8:
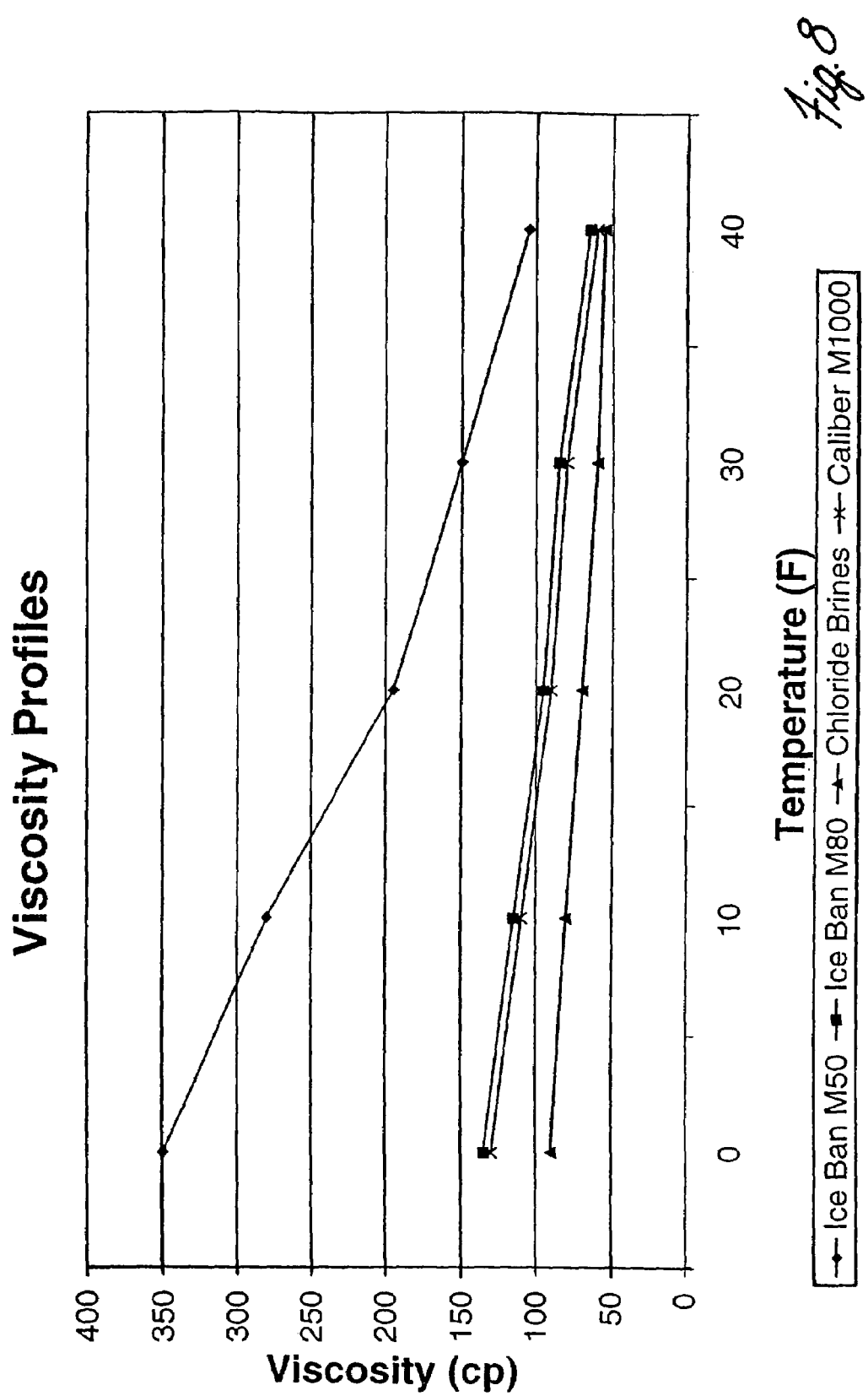
FIG. 8 is a graph showing the viscosity of a composition of the invention compared to the viscosity of prior art blends.

In one embodiment, the composition of the invention is designed to be slightly more viscous than a chloride brine, which aids in the ability to apply the composition to a surface, but less viscous than the commercial product known as Ice Ban M50. FIG. 8 shows the viscosity of chloride brines, two Ice Ban products, and an embodiment of the composition of the invention known as Caliber M1000. As FIG. 8 depicts, the viscosity profile changes with temperature. The viscosity of the embodiment known as Caliber M1000 has the desired viscosity profile between that of chloride brines and Ice Ban M50.

Figure 9:
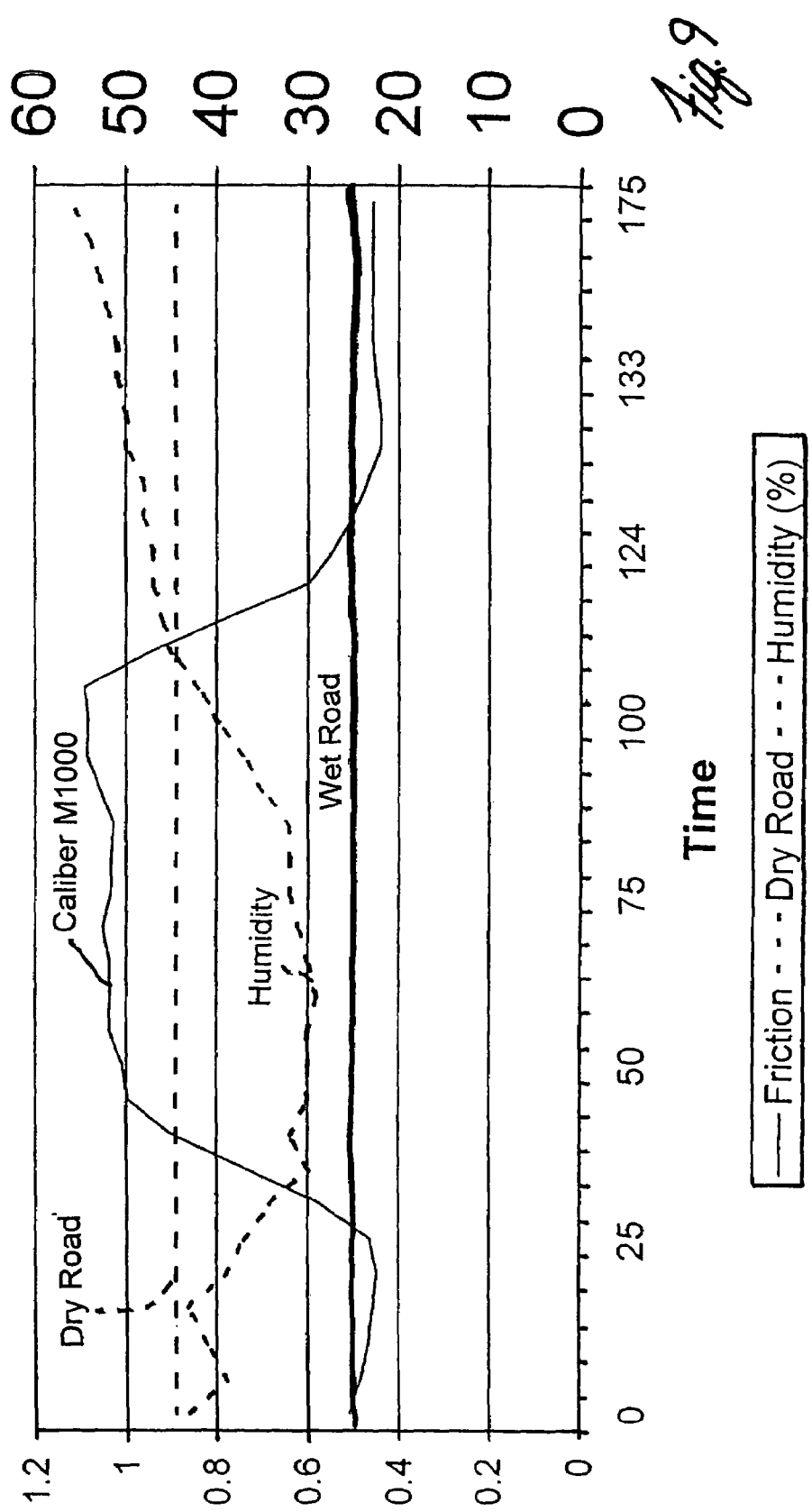
FIG. 9 is a graph of the friction value for a dry road compared to a road treated with an embodiment of the invention as the humidity varies over time.

FIG. 9 is a graph of the friction value for a dry road compared to a road treated with Caliber M1000 as the humidity varies over time. As FIG. 9 shows at the left-hand side, a surface treated with Caliber M1000 will be more slick than a dry road (i.e., a road with no moisture on it). The surface treated with Caliber M1000, however, will not be significantly more slick than a wet road. As the humidity increases (between about 25 and 100 minutes on FIG. 9), the surface treated with Caliber M1000 is the least slick surface—less slick than a dry road. The right-hand side of FIG. 9 shows that when the humidity decreases, the slickness of the Caliber M1000 treated surface increases, but it does not get significantly more slick than a wet surface.

The embodiments of the invention discussed above offer a variety of advantages over the prior art. One advantage is that the effective temperature range of the embodiments of the invention are considerably lower than commercially available brine solutions that are commonly used. Such brine solutions are usually ineffective at temperatures below approximately 5 deg. F. The embodiments of the invention may therefore be effective at lower temperatures and may have greater efficiency at higher temperatures than do currently available de-icing products. Another related advantage of the embodiments of the invention is a low eutectic point.

Other advantages of the embodiments of the invention include low corrosion, an enhanced or higher viscosity so that the product will remain on the road or surface of application for a longer period of time, and increased ease of handling over commercially available products. The embodiments of the invention may also reduce the impact on the environment because the embodiments of the invention contain less chloride than most commercially available de-icing products and are organic and hence biodegradable. In addition, because the embodiments of the invention offer higher performance, such that a smaller amount of the embodiments of the invention may have the same effect as a large amount of a prior art de-icing agent, smaller amounts of the embodiments of the invention may be applied to a surface and less environmental harm will result than for prior art de-icing agents.

While the present invention has been described with reference to several embodiments thereof, those skilled in the art will recognize various changes that may be made without departing from the spirit and scope of the claimed invention. Accordingly, this invention is not limited to what is shown in the drawings and described in the specification but only as indicated in the appended claims. Any numbering or ordering of elements in the following claims is merely for convenience and is not intended to suggest that the ordering of the elements of the claims has any particular significance other than that otherwise expressed by the language of the claims.

I claim:

1. A de-icing composition, comprising an aqueous solution of a salt, a corn syrup sugar, and glycerol, wherein the aqueous solution has a eutectic point of less than −70° F. and wherein the salt is selected from the group consisting of magnesium chloride, sodium chloride, calcium chloride, potassium chloride, potassium acetate, magnesium potassium acetate, and combinations of any thereof.

2. The de-icing composition of claim 1, wherein the corn syrup sugar is selected from the group consisting of a high fructose corn syrup, and a corn syrup sugar within the range of 25 dextrose equivalents (D.E.) to 63 dextrose equivalents (D.E.).

3. The de-icing composition of claim 1, wherein the aqueous solution has a pH of about 7.

4. The de-icing composition of claim 1, wherein corn syrup sugar is high fructose corn syrup and the salt is selected from the group consisting of magnesium chloride and potassium acetate.

5. The de-icing composition of claim 1, wherein the aqueous solution additionally comprises steepwater solubles.

6. The de-icing composition of claim 1, wherein the aqueous solution additionally comprises an acid selected from the group consisting of lactic acid, citric acid, and acetic acid.

7. The de-icing composition of claim 1, wherein the solution comprises greater than 1% by weight sugar solids.

8. The de-icing composition of claim 1, wherein the solution comprises at least 5% sugar solids.

9. The de-icing composition of claim 1, wherein the solution comprises from 15% to 90% sugar solids.

10. The de-icing composition of claim 1, wherein the solution comprises 90% by volume of a 30% by weight magnesium chloride solution.

11. The de-icing composition of claim 1, wherein the solution comprises 80% by volume of a 30% by weight magnesium chloride solution.

12. The de-icing composition of claim 1, wherein the solution comprises 60% by volume of a 30% by weight magnesium chloride solution.

13. A process for de-icing a surface, comprising contacting an aqueous solution of a salt, a corn syrup sugar, and glycerol with a surface, wherein the aqueous solution has a eutectic point of less than −70° F. and wherein the salt selected from the group consisting of magnesium chloride, sodium chloride, calcium chloride, potassium chloride, potassium acetate, magnesium potassium acetate, and combinations of any thereof.

14. The process of claim 13, wherein the corn syrup sugar is selected from the group consisting of a high fructose corn syrup, and a corn syrup sugar within the range of 25 dextrose equivalents (D.E.) to 63 dextrose equivalents (D.E.).

15. The process of claim 14, wherein corn syrup sugar is high fructose corn syrup and the salt is selected from the group consisting of magnesium chloride and potassium acetate.

* * * * *